United States Patent
Stephens

(10) Patent No.: US 6,828,934 B2
(45) Date of Patent: Dec. 7, 2004

(54) WAVELENGTH DIVISION MULTIPLEXING METHODS AND APPARATUS FOR CONSTRUCTING PHOTONIC BEAMFORMING NETWORKS

(75) Inventor: Ronald Regis Stephens, Westlake Village, CA (US)

(73) Assignee: HRL Laboratories, LLC, Malibu, CA (US)

(*) Notice: Subject to any disclaimer, the term of this patent is extended or adjusted under 35 U.S.C. 154(b) by 0 days.

(21) Appl. No.: 10/196,444

(22) Filed: Jul. 15, 2002

(65) Prior Publication Data
US 2002/0180637 A1 Dec. 5, 2002

Related U.S. Application Data

(62) Division of application No. 09/593,188, filed on Jun. 14, 2000, now Pat. No. 6,452,546.

(51) Int. Cl.[7] .................................................. H01Q 3/26
(52) U.S. Cl. ...................................... 342/373; 342/375
(58) Field of Search ............................... 342/368, 373, 342/374, 375

(56) References Cited

U.S. PATENT DOCUMENTS

| | | |
|---|---|---|
| 4,725,844 A | 2/1988 | Goodwin et al. |
| 5,369,410 A | 11/1994 | Reich .......................... 342/175 |
| 5,374,935 A | 12/1994 | Forrest ........................ 342/368 |
| 5,475,392 A | 12/1995 | Newberg et al. ............. 342/375 |
| 5,631,758 A | 5/1997 | Knox et al. |
| 5,859,719 A | 1/1999 | Dentai et al. |
| 5,861,845 A | 1/1999 | Lee et al. |
| 5,867,291 A | 2/1999 | Wu et al. .................... 359/124 |
| 5,926,298 A | 7/1999 | Li |
| 5,999,128 A | 12/1999 | Stephens et al. |
| 6,181,449 B1 | 1/2001 | Taga et al. |
| 6,198,721 B1 | 3/2001 | Mueller |
| 6,204,944 B1 | 3/2001 | Uchiyama et al. |
| 6,208,444 B1 | 3/2001 | Wong et al. |

(List continued on next page.)

FOREIGN PATENT DOCUMENTS

| | | |
|---|---|---|
| EP | 0 392 416 A1 | 10/1990 |
| EP | 0 664 465 A2 | 7/1995 |
| WO | 01/15269 A1 | 3/2001 |

OTHER PUBLICATIONS

U.S. patent application Ser. No. 10/196,480, Stephens, filed Jul. 15, 2002.
U.S. patent application Ser. No. 10/632,354, Stephens, filed Jul. 31, 2003.
U.S. patent application Ser. No. 10/696,607, Yap, filed Oct. 28, 2003.

(List continued on next page.)

Primary Examiner—Dao Phan
(74) Attorney, Agent, or Firm—Ladas & Parry

(57) ABSTRACT

Methods and apparatus for constructing phased array antenna beamforming networks are provided, that allow to scan multiple beams and select appropriate sets of delay lines simultaneously. The beamforming networks disclosed herein generate less losses than conventional ones and in some cases, do not require active switching, making them completely passive. Three main methods are comprised in the invention: (1) laser wavelength hierarchies, (2) arrangements of Wavelengths Division Multiplexing (WDM) components, (3) re-use of laser wavelengths. Multiple laser wavelengths are arranged in groups and subgroups (wavelength hierarchies) in the wavelength domain. By switching between these wavelength groupings, the arrangements of WDM components disclosed herein enable the beamforming network to direct the beam signals to the proper time delay lines, and to differentiate multiple beams. The method of laser wavelength re-use permits to significantly reduce the number of wavelengths utilized, and thus to limit them to the standard wavelengths specified by the ITU.

3 Claims, 20 Drawing Sheets

U.S. PATENT DOCUMENTS

| | | | |
|---|---|---|---|
| 6,229,937 B1 | 5/2001 | Nolan et al. | |
| 6,266,176 B1 | 7/2001 | Anderson et al. | 359/245 |
| 6,271,949 B1 | 8/2001 | Suemura et al. | 359/128 |
| 6,337,660 B1 | 1/2002 | Esman et al. | 342/375 |
| 6,348,890 B1 * | 2/2002 | Stephens | 342/375 |
| 6,388,815 B1 | 5/2002 | Collins, Jr. et al. | 359/633 |
| 6,452,546 B1 | 9/2002 | Stephens | 342/368 |
| 2002/0012144 A1 | 1/2002 | Lin et al. | 359/130 |

OTHER PUBLICATIONS

*Reference Data for Engineers: Radio, Electronics, Computer, and Communications,* Seventh Edition, Howard W.Sams & Co., Indianapolis, pp. 32–39 through 32–41 (1988).

Anderson, B.L., et al., "Binary–Counting True Time Delay Generator Using a White Cell Design and Deformable Mirror Devices," *IEEE,* pp. 273–274 (1998).

Anderson, B.L., et al., "Optically Produced True–Time Delays for Phased Antenna Arrays," *Applied Optics,* vol. 36, No. 32, pp. 8493–8503 (Nov. 10, 1997).

Curtis, D.D., "Holographic Rotman Lens for Phased–Array Antenna Beamforming," *SPIE,* vol. 2481 pp. 104–113.

Li, R.L.Q., et al., "3–Bit Substrate–Guided–Mode Optical True–Time–Delay Lines Operating at 25 GHz," *IEEE Photonics Technology Letters,* vol. 9, No. 1, pp. 100–102 (Jan. 1997).

Sparks, R.A., "Progress in Optical Rotman Beamformaer Technology," *IEEE,* pp. 357–360 (2000).

White, J.U., "Long Optical Paths of Large Aperture," *J.O.S.A.,* vol. 32, pp. 285–288 (May 1942).

Gopalakrishnan, G.K., et al., "Microwave–Optical Mixing in $LiNbO_3$ Modulators", *IEEE Transactions on Microwave Theory and Techniques,* vol. 41, No. 12, pp. 2383–2391 (Dec. 1993).

Logan, Jr., R.T, et al., "Millimeter–Wave Photonic Downconvertors: Theory and Demonstrations", Proceedings of SPIE Conference on Optical Technology for Microwave Applications VII, San Diego, CA, pp. 2–13 (Jul. 9–14, 1995).

Stimson. George W., "Introduction to Airborne Radar", Second Edition, *SciTech Publishing, Mendham,* New Jersey, 199, Chapter 40, p. 513.

* cited by examiner

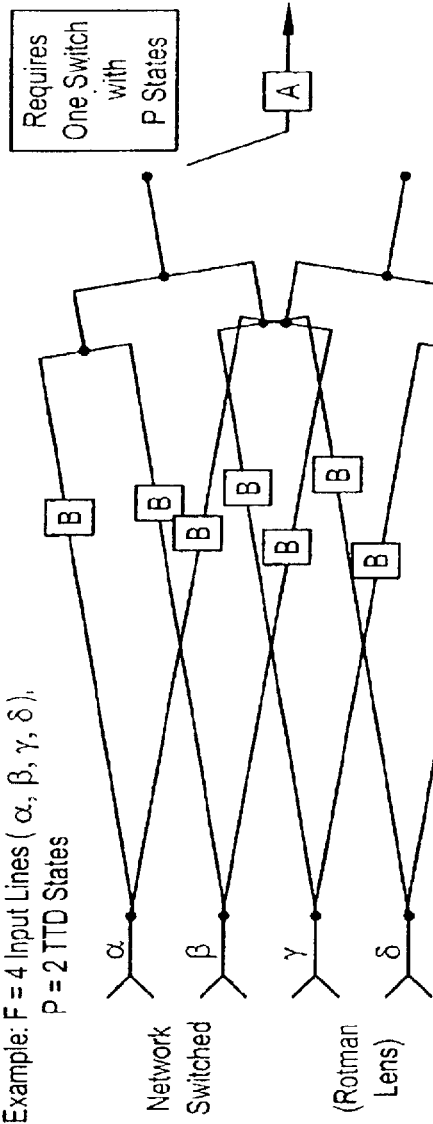
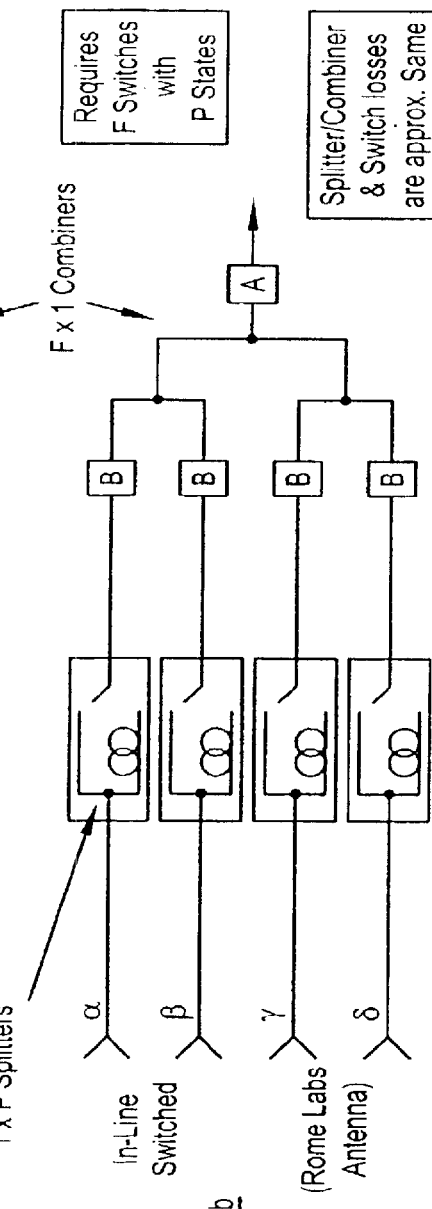
Figure 1a
Figure 1b
PRIOR ART

WAVELENGTH DIVISION MULTIPLEXING METHODS AND APPARATUS FOR CONSTRUCTING PHOTONIC BEAMFORMING NETWORKS

This patent application is a divisional application of U.S. Ser. No. 09/593,188, filed Jun. 14, 2000 and now issued U.S. Pat. No. 6,452,546. This application is related to U.S. Ser. No. 10/003,396, filed Oct. 22, 2001 and now issued U.S. Pat. No. 6,535,165, which is a divisional application U.S. Ser. No. 09/383,819, filed on Aug. 26, 1999 and now issued U.S. Pat. No. 6,348,890. This application is further related to U.S. Ser. No. 10/696,607, filed on Oct. 28, 2003.

FIELD OF THE INVENTION

This invention relates to the field of phased array antennas that are controlled by networks of optical fibers and other photonic components, such as photonic beamforming networks. More specifically, it relates to methods for constructing low-loss, passive photonic beamforming networks.

BACKGROUND OF THE INVENTION

Phased array antenna systems are widely used in radar, electronic warfare and high data-rate communications applications. They are sometimes controlled by networks of optical fibers and other photonic components such as lasers, fibber splitters/combiners, and photodetectors. These control networks mainly utilize delay line networks such as the ones shown in FIG. 1. There are two types of delay line networks which differ in the way time delays are implemented. In the network switched architecture of FIG. 1a, of which the Rotman lens is an example, entire networks of delay lines are switched in/out by a single switch. In the in-line switched architecture of FIG. 1b, there are several delay lines within each fiber as well as a switch to select them. If F is the number of fibers and P the number of delay states, the network switched architecture requires one switch with P states, and the in-line switched architecture F switches with P states. Both require 1×P splitters to access P delay states, and F×1 combiners to vector sum the outputs. For both types of networks, the signal passes through one 1×P splitter, one switch, and one F×1 combiner, so the losses are expected to be comparable.

The number of photodetectors required in the network can be a major cost driver so it is desirable to minimize it. To achieve this, one can place a single photodetector at position A in FIGS. 1a and 1b, after the F×1 combiner which vector sums the fiber signals. However, if all fibers carry the same optical wavelength, as it is the case in most prior art systems, the different signals will interfere and unwanted noise will appear on the detected carrier envelope. In order to avoid this optical coherence problem, photodetectors can be placed at positions B so that photodetection occurs prior to summation, and the optical carriers never interact. However, a large number of photodetectors is then required and cost is greatly increased.

To solve optical coherence problems, while still minimizing the number of photodetectors required, this invention utilizes multiple optical wavelengths. This reduces photodetector count from F×P to 1 in the network switched case (FIG. 1a), and from F to 1, in the in-line switched case (FIG. 1b).

Furthermore, in accordance with this invention, the lossy splitters/combiners that form the actively switched prior art networks of FIGS. 1a and 1b, are replaced by a passive Wavelength Division Multiplexing (WDM) network. The 1×P splitters and F×1 combiners are replaced with WDMs, and the functions performed by active switches are realized by separating wavelength groups with passive WDMs. Optical losses in a 1×N WDM are less than in a 1×N splitter or combiner for N>6, so in most practical cases losses can be substantially reduced.

Prior art photonic networks require active switching, the use of a large number of photodetectors, and inclusion within the network of lossy splitters and combiners. In many cases the prior art also requires specialized or unique optical components.

Prior photonic beamforming art such as described in U.S. Pat. No. 5,861,845 (Wideband Phased Array Antennas and Methods) alludes to using multiple wavelengths to avoid optical coherence effects, but losses are still high in the combiners which vector sum the optical signals. patent application Ser. No. 09/383,819 (Phased Array Antenna Beamformer) describes a passive receiver network for multiple beams which employs WDMs for beam scanning and delay line selection. However, it does not address optical coherence problems, and uses three-dimensional fiber optics based delay line networks (fiber Rotman lens) which are hard to fabricate. It also utilizes lossy combiners for signal summation.

The present invention addresses and solves these problems in a simple, unified manner, and can be implemented using standard ITU (International Telecommunication Union) components developed commercially for fiber optics data networks, and two-dimensional SOS (Silicon on Sapphire) fabrication techniques.

SUMMARY OF THE INVENTION

In accordance with the present invention, a number N of incoming RF wavefronts are simultaneously received by an antenna array. Laser light is amplitude modulated to provide B=N synthesized optical beams. The synthesized optical beams are mixed with the incoming electrical wavefronts by optical modulation. The resultant N optical wavefronts, all traveling through common waveguides, are each directed to a predetermined set of delay lines, and subsequently separated and channeled into N separate waveguides. The original incoming wavefronts carried by the synthesized optical beams are now differentiated and can be photodetected and analyzed separately.

This invention discloses novel ways to perform these functions utilizing photonic beamforming networks. It provides methods for constructing low-loss, completely passive, high performance photonic beamforming networks that can simultaneously control beam scanning and delay line selection for multiple beams. The invention comprises three main methods which include:

(1) laser wavelength hierarchies,
(2) arrangements of wavelength division multiplexing (WDM) components, and
(3) re-use of laser wavelengths.

Multiple laser wavelengths are arranged in groups and subgroups (wavelength hierarchies) in the wavelength domain. By switching between these wavelength groupings, the arrangements of WDM components proposed herein enable the beamforming network to direct the beam signals through the proper time delay lines, and to differentiate multiple beams. No switching occurs within the network itself, only at the controlling lasers, and the network is completely passive. Furthermore, signal routing, beam differentiation, and beam vector summation occur with minimal losses due to the arrangements and choice of WDM components and interconnections. The invention also minimizes the number of photodetectors required, and only one photodetector per beam is needed in its most powerful form.

The method of laser wavelength re-use permits significant reduction in the number of wavelengths required for the beamformer to function. This allows the wavelengths to be limited to the standard ones specified by the International Telecommunication Union, even with phased array antennas that contain a very large number of elements.

Another aspect of the invention, a non-passive, output-switched network, that minimizes the number of wavelengths required is also disclosed.

BRIEF DESCRIPTION OF THE DRAWINGS

FIGS. 1a and 1b depict the two types of delay line networks conventionally used, Network Switched and In-Line Switched, respectively.

FIGS. 12, 12a and 12b depict a three-dimensional structure constituting a Network Switched delay line network for the case of a 4×4 fiber array feeding four delay ports.

DETAILED DESCRIPTION

Figure 4:
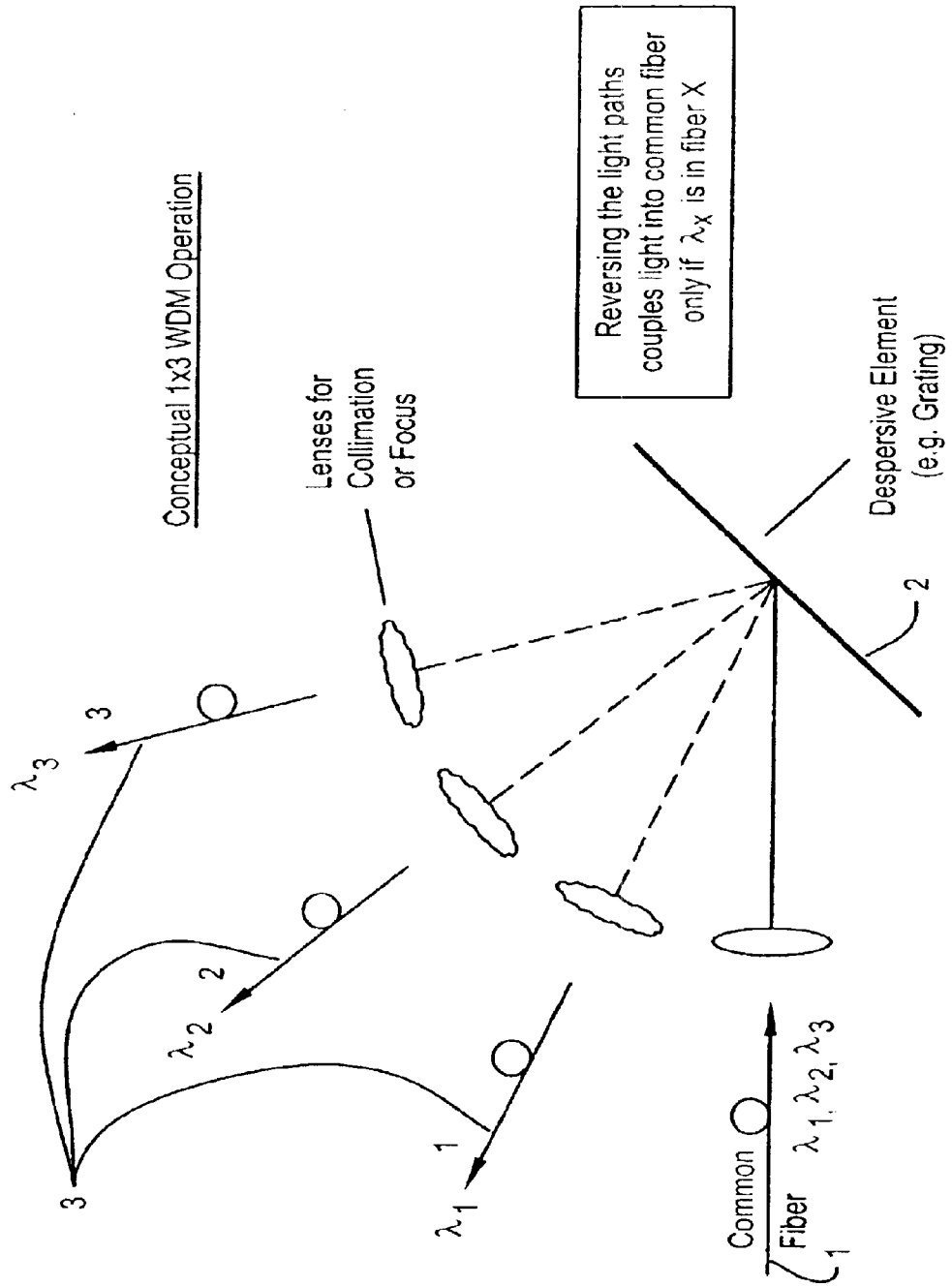
FIG. 4 shows how a 1×3 WDM conceptually operates.

The present invention utilizes simple Wavelength Division Multiplexing (WDM) technology in a number of ways. FIG. 4 shows, for N=3, how a 1×N WDM operates. A single common fiber 1 carries N wavelengths to a dispersive element 2 which spatially separates these wavelengths, and directs them to N single wavelength fibers 3. This device can be run in reverse as an N×1 combiner. In this mode, it is assumed that if the wrong wavelength is in one of the single wavelength fibers, it does not couple into the common fiber. The wavelength bands passed by the WDM are adjustable during fabrication.

Figure 2:
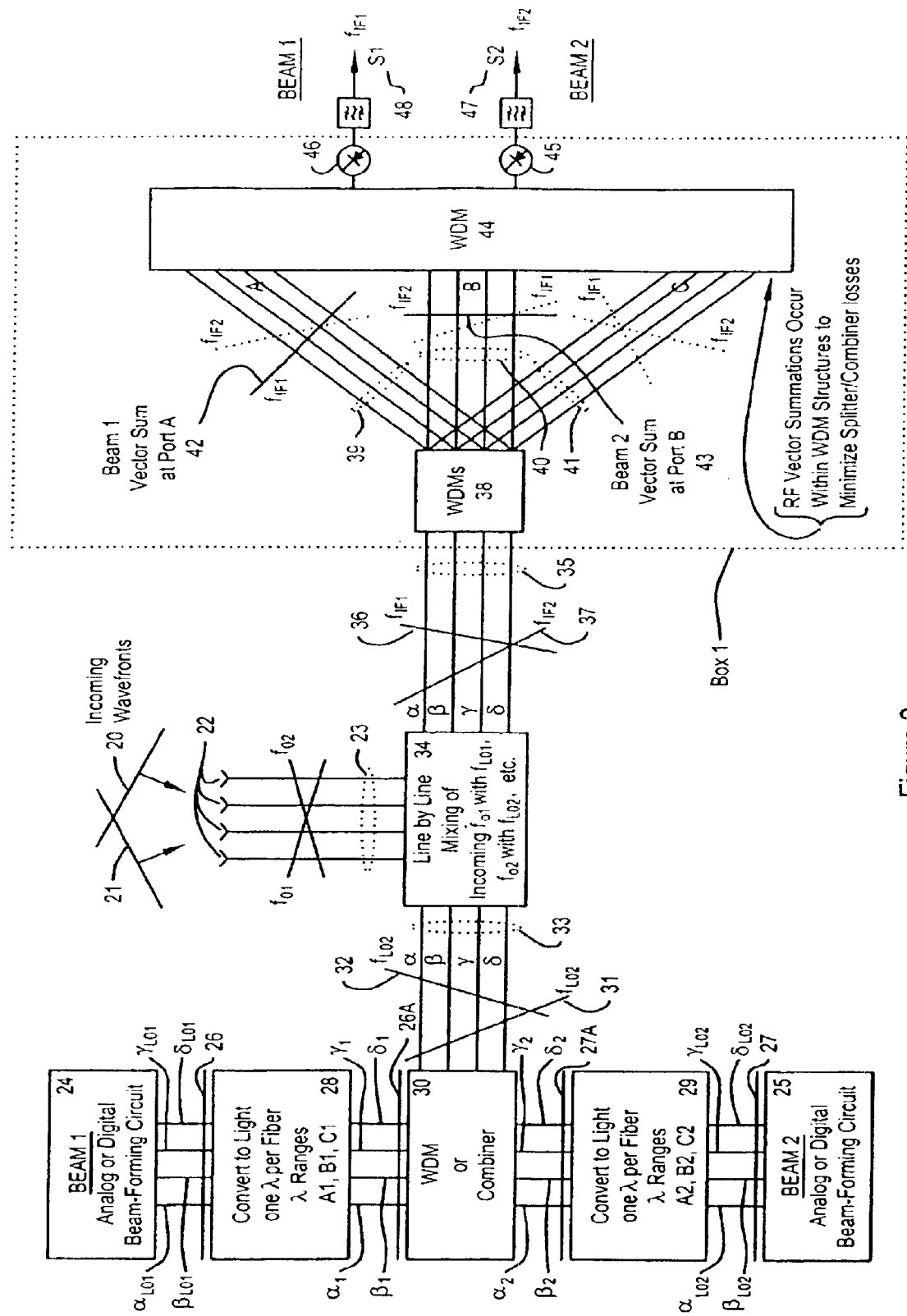
FIG. 2 is a schematic block diagram overview of an embodiment in accordance with the present invention applied to a Heterodyne True-Time-Delay system.

Referring to FIG. 2, a schematic block diagram overview of an embodiment of the invention applied to a Heterodyne True-Time-Delay system is shown. This particular system, has the capability to receive B=2 incoming wavefronts and direct each one to a separate output utilizing B=2 synthesized laser beams (beam1 and beam2), F=4 optical fibers ($\alpha$, $\beta$, $\gamma$, $\delta$) and P=3 ports or delay lines (A, B, C). For ease of understanding, it is further assumed that the system is set to direct beam 1 to port A and beam 2 to port B.

Wavefronts 20 and 21 at respective frequencies $f_{o1}$ and $f_{o2}$ are received by antenna array 22. Wavefronts 20 and 21 are detected and then travel down a set of feed lines 23.

Analog or digital beam-forming circuit 24 generates local oscillator wavefront 26. Wavefront 26 is in the electrical domain at RF frequency $f_{LO1}$ and is defined by the relative phases of frequency $f_{LO1}$ in four electrical cables or waveguides $\alpha_{LO1}$, $\beta_{LO1}$, $\gamma_{LO1}$, $\delta_{LO1}$. These electrical signals are used by port/beam selection block 28 to intensity modulate four lasers whose output intensities then bear the same relative phases as the local oscillator wavefront 26. These four optical signals are then output to four optical fibers $\alpha_1$, $\beta_1$, $\gamma_1$, $\delta_1$ where the relative phases of the light intensity among the fibers define an optical wavefront 26A. Symmetrically, analog or digital beam-forming circuit 25 generates local oscillator wavefront 27. Port/beam-selection block 29 converts wavefront 27 to optical wavefront 27A and outputs, to each of its four output fibers ($\alpha_2$, $\beta_2$, $\gamma_2$, $\delta_2$), a single wavelength according to the specific delay line (port) desired for beam 2.

WDM 30 acting in combine mode, directs laser light from $\alpha_1$ and $\alpha_2$ into fiber $\alpha$, laser light from $\beta_1$ and $\beta_2$ into fiber $\beta$, laser light from $\gamma_1$ and $\gamma_2$ into fiber $\gamma$, and laser light from $\delta_1$ and $\delta_2$ into fiber $\delta$. Thus, each optical fiber $\alpha$, $\beta$, $\gamma$ and $\delta$, forming set of feed lines 33, carries two wavelengths. This results in two optical wavefronts, 31 and 32, traveling through set of fiber lines 33 at local oscillator frequencies $f_{LO1}$ and $f_{LO2}$ respectively.

Incoming wavefront 20 and synthesized wavefront 32 intersect one another in mixers 34 and line by line mixing of the two wavefronts occurs. Such mixing up-converts or down-converts the $f_{o1}$ frequency to intermediate frequency $f_{IF1}$. Similarly, wavefront 21 and synthesized wavefront 31 intersect one another in mixers 34 and line by line mixing of the two wavefronts produces intermediate frequency $f_{IF2}$. Wavefronts 36 and 37 travel down set of feed lines 35 and enter WDMs 38. Wavefronts 36 and 37 are each directed to the desired port through the corresponding set of delay lines 39 (port A), 40 (port B) or 41 (port C). In the particular example of FIG. 2, WDMs 38 outputs beam 1 to port A and beam 2 to port B. Wavefronts 42 and 43 travel through set of delay lines 39 and 40, respectively, and enter WDMs 44.

Within WDM 44, wavefront 42 (beam 1), entering through delay lines set 39, is vector summed into a single fiber and directed to photodetecting device 46. Electrical signal 48 (corresponding to beam 1) is output by photodetecting device 46 and is sent to a data processing unit. Similarly, wavefront 43, entering through delay lines set 40, is vector summed into a single fiber and directed to photodetecting device 45. Electrical signal 47 (corresponding to beam 2) is output by photodetecting device 45 and is sent to a data processing unit.

Thus, incoming wavefronts 20 and 21 which were detected simultaneously have been differentiated by the system forming the present invention, and the information they carry can be processed separately.

Although a specific configuration is treated in FIG. 2, the same principles hold for, and the invention is applicable to, two-dimensional systems, for any values of B, F, and P, and to other types of beamforming devices such as the Heterodyning Rotman beamformer.

Figure 3A:
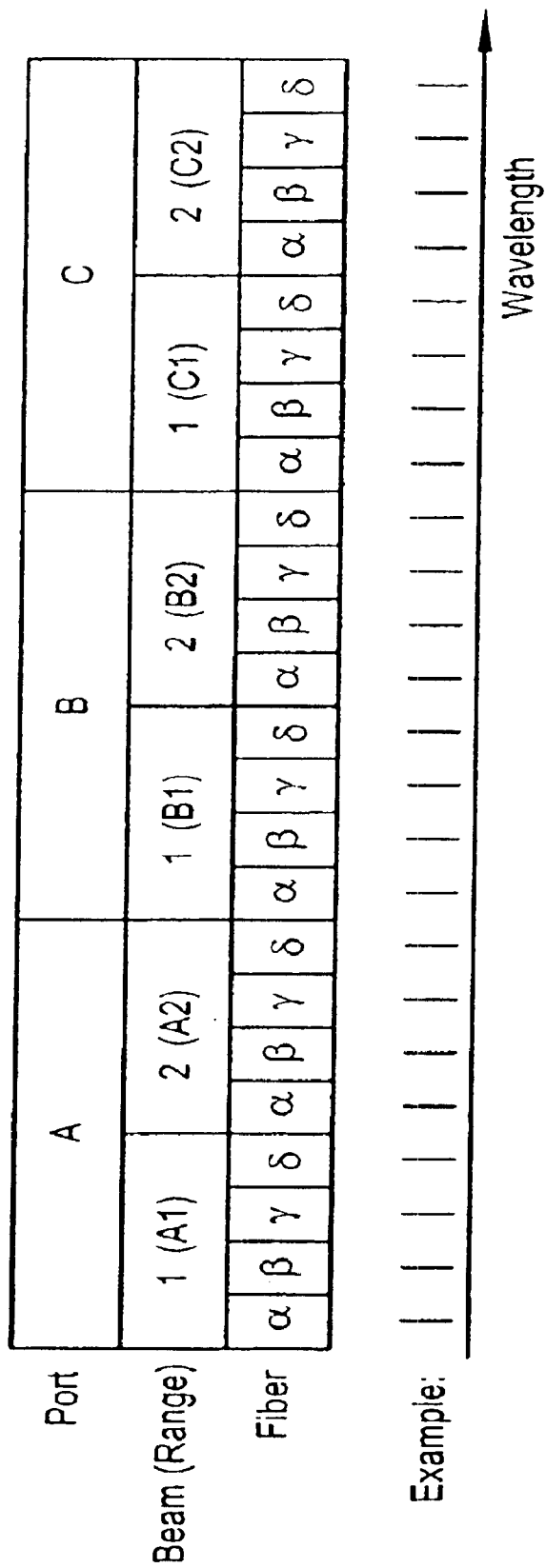
FIG. 3a is a table illustrating the wavelength hierarchy required for the embodiment of FIG. 2
Figure 3B:
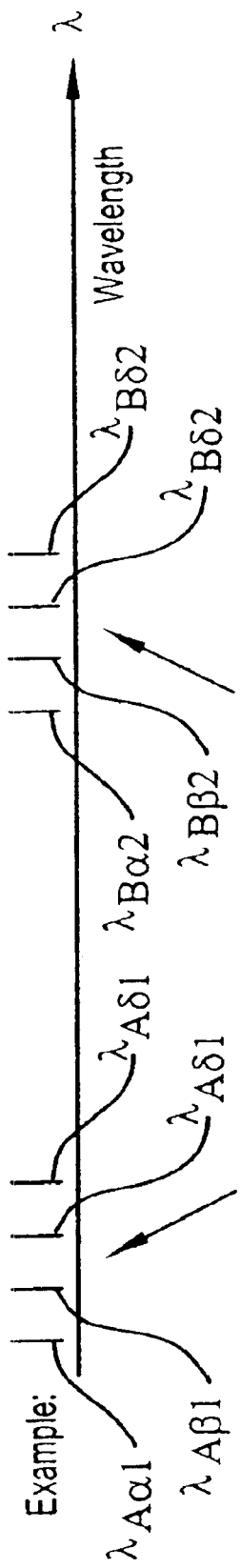
FIG. 3b is an example of the laser wavelengths activated when beam 1 is directed to port A and beam 2 is directed to port B.

FIG. 3a shows the WDM wavelength hierarchy required for the embodiment of the invention shown in FIG. 2. For such a system, it is necessary that $N\lambda=24$ ($P \times B \times F=3 \times 2 \times 4$) wavelengths be available to blocks 28 and 29 of FIG. 2 (12 for block 28, and 12 for block 29). Block 28 will activate one of wavelength ranges A1, B1 or C1, depending on which port is selected for beam 1, block 29 will activate one of wavelength ranges A2, B2 or C2 according to which port is chosen for beam 2. Wavelength ranges A1, B1, C1, A2, B2, C2 are each composed of F=4 wavelengths as illustrated in FIG. 3a. Thus, port and beam selection is accomplished by switching groups of F=4 wavelengths for each beam, FIG. 3b shows which specific wavelengths need to be activated in order to direct beam 1 to port A and beam 2 to port B. To achieve this, the F=4 wavelengths corresponding to the A1 range, namely $\lambda_{A\alpha 1}$, $\lambda_{A\beta 1}$, $\lambda_{A\gamma 1}$, $\lambda_{A\delta 1}$, and the F=4 wavelengths corresponding to the B1 range, namely $\lambda_{B\alpha 2}$, $\lambda_{B\beta 2}$, $\lambda_{B\gamma 2}$, $\lambda_{B\delta 2}$ are activated.

Expansion to include more fibers, beams, or ports is accomplished by adding additional wavelengths to either side of the range shown in FIG. 3b.

Figure 5:
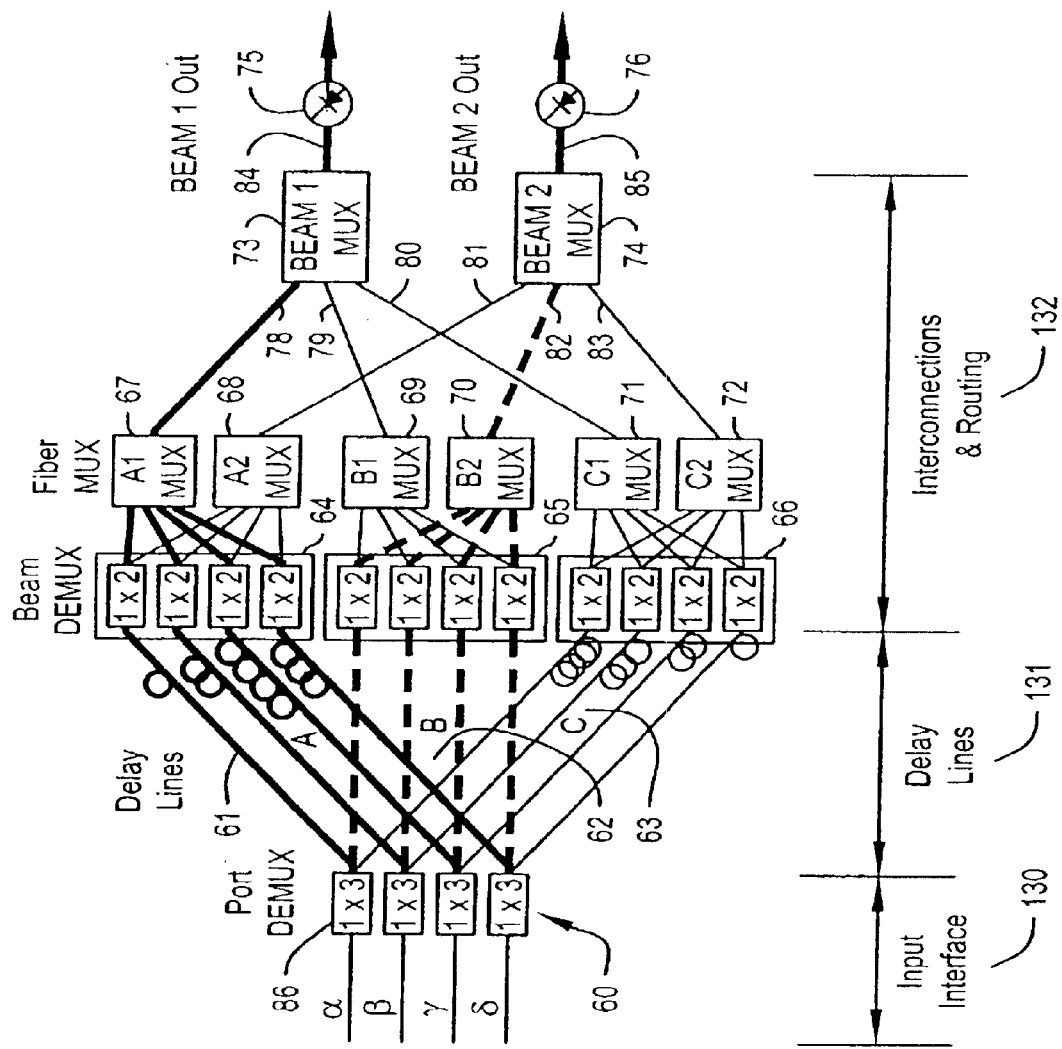
FIG. 5 is a block diagram depiction of box 1 from FIG. 2. It shows the specific arrangement of WDMs and interconnections required to perform the functions discussed in conjunction with FIG. 2 and FIG. 3.

Referring to FIG. 5, the specific arrangement of WDM filters and interconnections required to perform the functions discussed in conjunction with FIG. 2 and FIG. 3, is shown. FIG. 5 is a detailed block diagram representation of box 1 from FIG. 2. The light paths for beam 1 going through port A (heavy solid lines) and beam 2 going through port B (heavy dashed lines) are highlighted in the figure.

Light in fibers α, β, γ, δ, enters 1×3 port demultiplexer WDMs 60. The input fiber to each of these WDMs carries two wavelengths (one for beam 1 and one for beam 2 corresponding to wavefronts 36 and 37 of FIG. 2) and corresponds to common fiber 1 of FIG. 4. Each of the three output fibers of each WDM transmits a single-wavelength range A, B, or C as defined in FIG. 3a. Thus, depending upon which wavelength group A1, B1, C1, A2, B2, C2 enters, the WDMs select A, B or C sets of delay lines for beam 1 and beam 2. For example, let us consider fiber α and the corresponding WDMα 86 (FIG. 5). Two wavelengths (one for beam 1 and one for beam 2) traveling through fiber α enter WDMα. If both wavelengths are in the A wavelength range, one in the A1 range and one in the A2 range, WDMα will direct both wavelengths to delay line 61 (heavy solid line); If both wavelengths are in the B wavelength range, one in the B1 range and one in the B2 range, WDMα will direct both wavelengths to delay line 62 (heavy dashed line);

If both wavelengths are in the C wavelength range, one in the C1 range and one in the C2 range, WDMα will direct both wavelengths to delay line 63 (light solid line). If one wavelength, say $\lambda_{A\alpha}$, is in the A range (A1 or A2) and the other wavelength, say $\lambda_{B\alpha}$, is in the B range (B1 or B2), then WDMα will direct $\lambda_{A\alpha}$ to delay line 61 and $\lambda_{B\alpha}$ to delay line 62. If one wavelength, say $\lambda_{A\alpha}$, is in the A range (A1 or A2) and the other wavelength, say $\lambda_{C\alpha}$, is in the C range (C1 or C2), then WDMα will direct $\lambda_{A\alpha}$ to delay line 61 and $\lambda_{C\alpha}$ to delay line 63. If one wavelength, say $\lambda_{B\alpha}$, is in the B range (B1 or B2) and the other wavelength, say $\lambda_{C\alpha}$, is in the C range (C1 or C2), then WDMα will direct $\lambda_{B\alpha}$ to delay line 62 and $\lambda_{C\alpha}$ to delay line 63. Note that although WDMα has three output fibers, a maximum of two are active at any given time since only two wavelengths enter the WDM.

After passage through delay line set 61, 62, or 63, light from the four fibers of each delay line set next encounters beam demultiplexer WDM groups 64, 65 or 66. Each of these groups comprises four 1×2 WDMs. Wavelength ranges A1 and/or A2 enter WDM group 64 and get separated. Wavelengths in the A1 range are directed to fiber multiplexer WDM 67, and wavelengths in the A2 range are directed to fiber multiplexer WDM 68. In the same fashion, wavelength ranges B1 and/or B2 enter WDM group 65 to be separated. Wavelengths in the B1 range are directed to fiber multiplexer WDM 69, and wavelengths in the B2 range are directed to fiber multiplexer WDM 70. Lastly, wavelength ranges C1 and/or C2 enter WDM group 66 and get separated. Wavelengths in the C1 range are directed to fiber multiplexer WDM 71, and wavelengths in the C2 range are directed to fiber multiplexer WDM 72. This operation serves to place the beam 1 light on one fiber and the beam 2 light on the other fiber at the output of each 1×2 WDM comprised in WDM groups 64, 65 and 66.

Each fiber multiplexer WDM 67, 68, 69, 70, 71, and 72 receives light from four input fibers and combines them into a single output fiber. The four input fibers of each fiber multiplexer, each carry the individual wavelengths α, β, γ, δ shown under the A1, B1, C1, A2, B2, C2 ranges in FIG. 3a. Combination of the light from the four input fibers by the fiber multiplexers serves to vector sum the envelopes of the of the optical carriers and form the beams. Fiber multiplexers WDMs 67, 69 and 71 direct their single outputs to beam 1 multiplexer 73, through fibers 78, 79 and 80 respectively. Fiber multiplexers WDMs 68, 70 and 72 direct their single outputs to beam 2 multiplexer 74, through fibers 81, 82, 83 respectively. Fibers 78, 79 and 80, are then merged into a single fiber 84 by beam 1 multiplexer 73, and fibers 81, 82, 83 are merged into a single fiber 85 by beam 2 multiplexer 74. The input passbands of beam 1 multiplexer 73 are wavelength ranges A1, B1, and C1. The input passbands of beam 2 multiplexer 74 are wavelength ranges A2, B2, and C2. Beam 1, traveling through fiber 84, is photodetected by photodetecting device 75, and beam 2, traveling through fiber 85, is photodetected by photodetecting device 76. Only one photodetecting device per beam is required. Beam 1 always appears at the beam 1 output port and beam 2 at the beam 2 output port, independent of the beam scan angle and which delay line sets were chosen.

Figure 6:
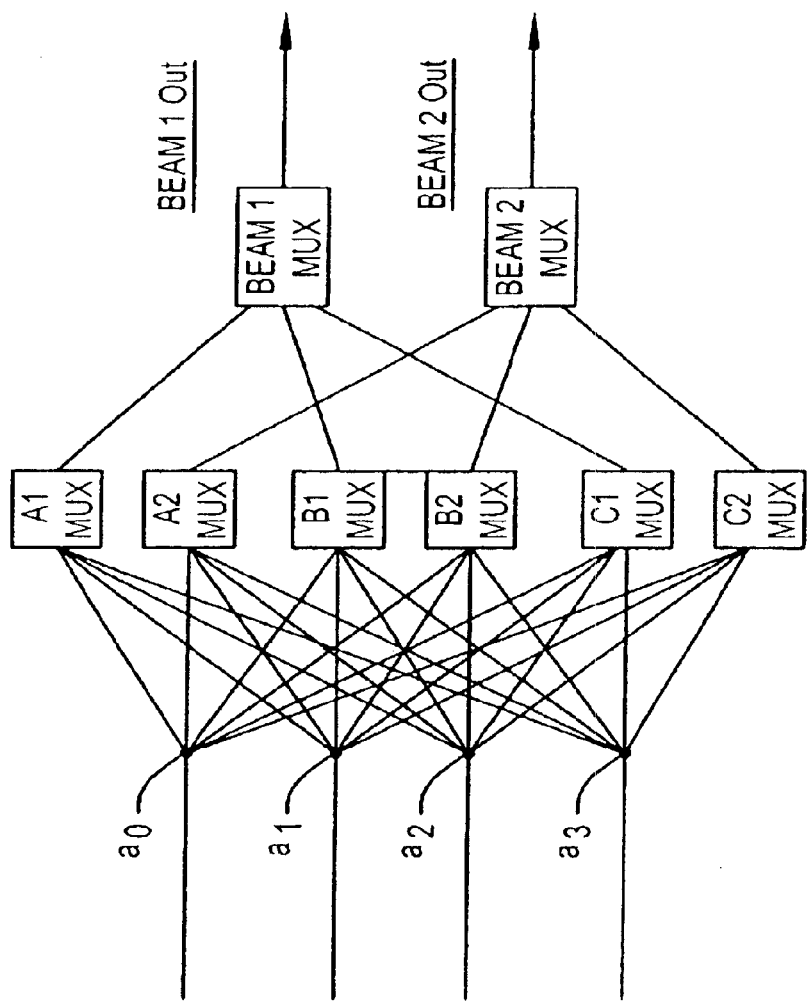
FIG. 6 is a variation of the network illustrated in FIG. 5, where WDMs have been replaced with fiber splitters.
Figure 7:
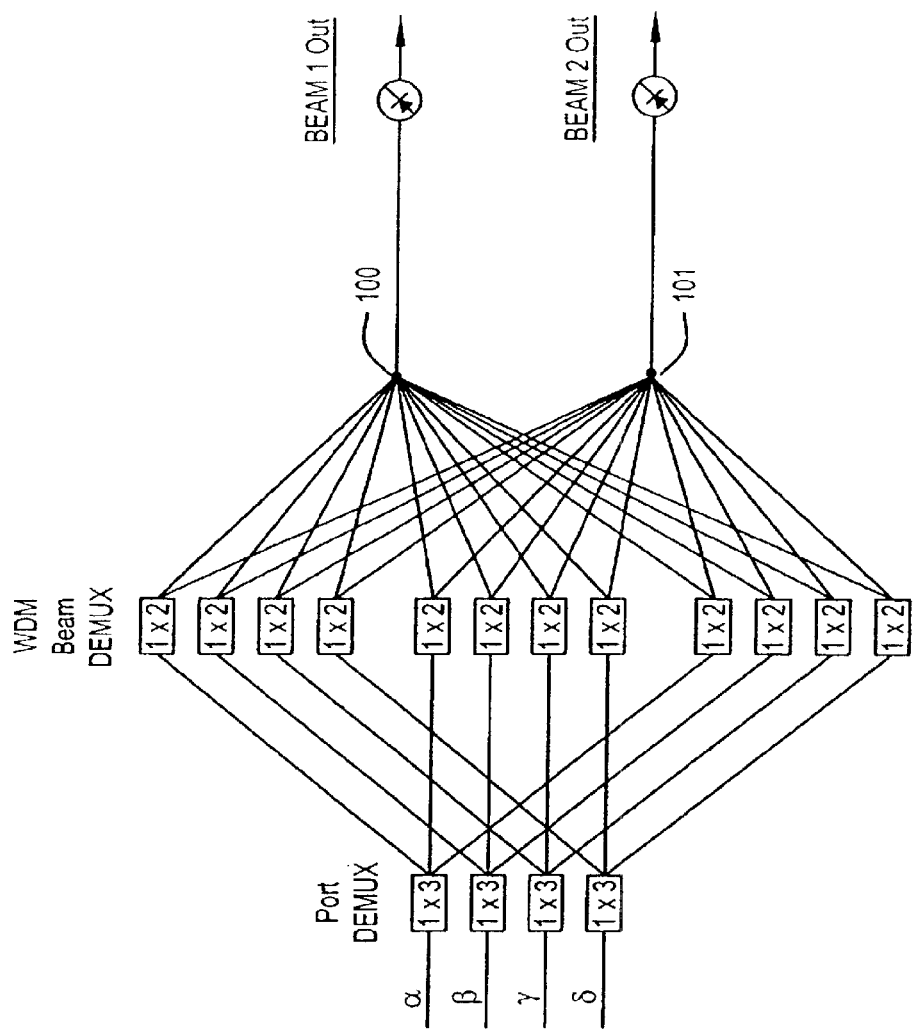
FIG. 7 is a variation of the network illustrated in FIG. 5, where WDMs have been replaced with fiber combiners.

In an alternative embodiment of the basic invention of FIG. 5, the port demultiplexers 60 and beam demultiplexers 64, 65, 66 are replaced with simple fiber splitters as illustrated by FIG. 6. This is possible because the filtering performed by the port and beam demultiplexers 60, 64, 65, 66 is redundant to the filtering performed by the fiber multiplexers 67, 68, 69, 70, 71, and 72. Referring to FIG. δ, the port and beam demultiplexers of FIG. 5, have been replaced by four 1×6 fiber splitters. The rest of the configuration remains the same, and the same functions are performed. Alternatively, the fiber and beam multiplexers can be replaced with combiners without affecting the performance of the network. This configuration is shown in FIG. 7., two 12×1 combiners 100 and 101 replace fiber and beam multiplexers 67, 68, 69, 70, 71, 72, 73, and 74 of FIG. 5.

Figure 8:
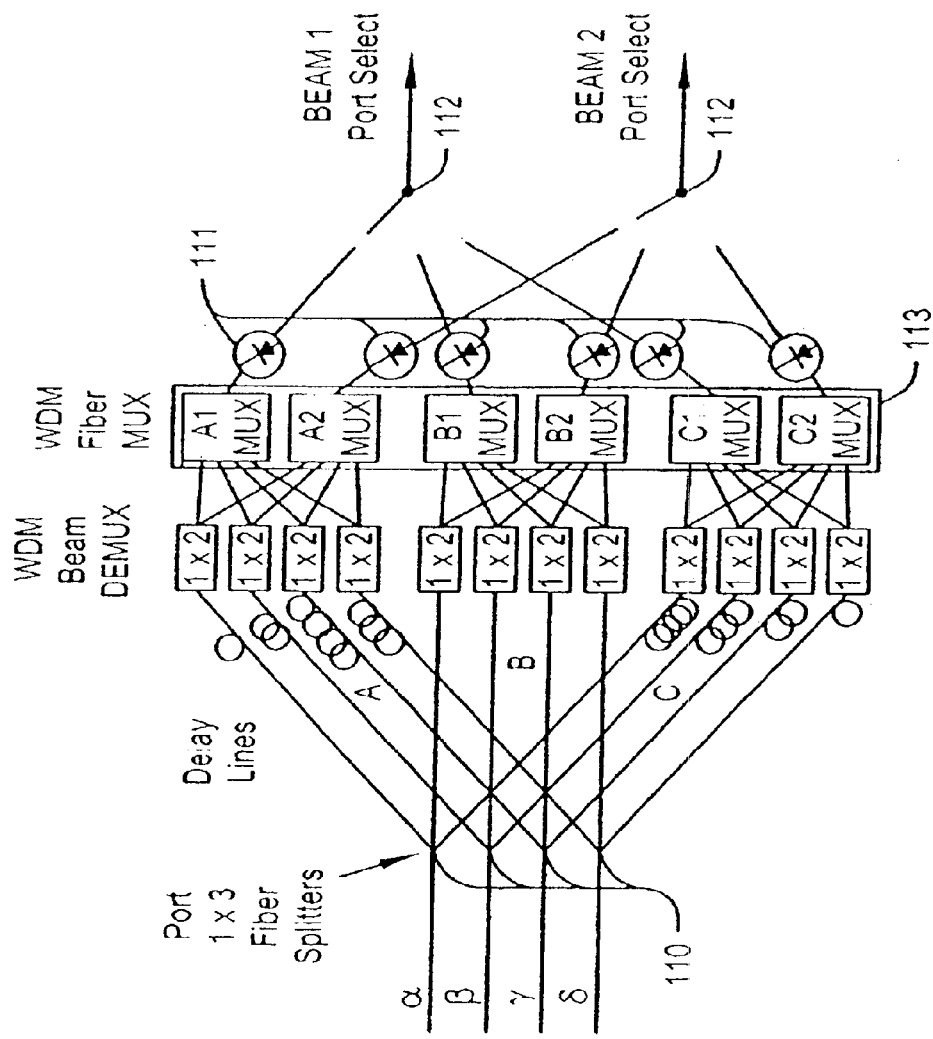
FIG. 8 is another variation of the invention of FIG. 5, utilizing port splitters and electrical switches to reduce the number of wavelengths required.
Figure 11:
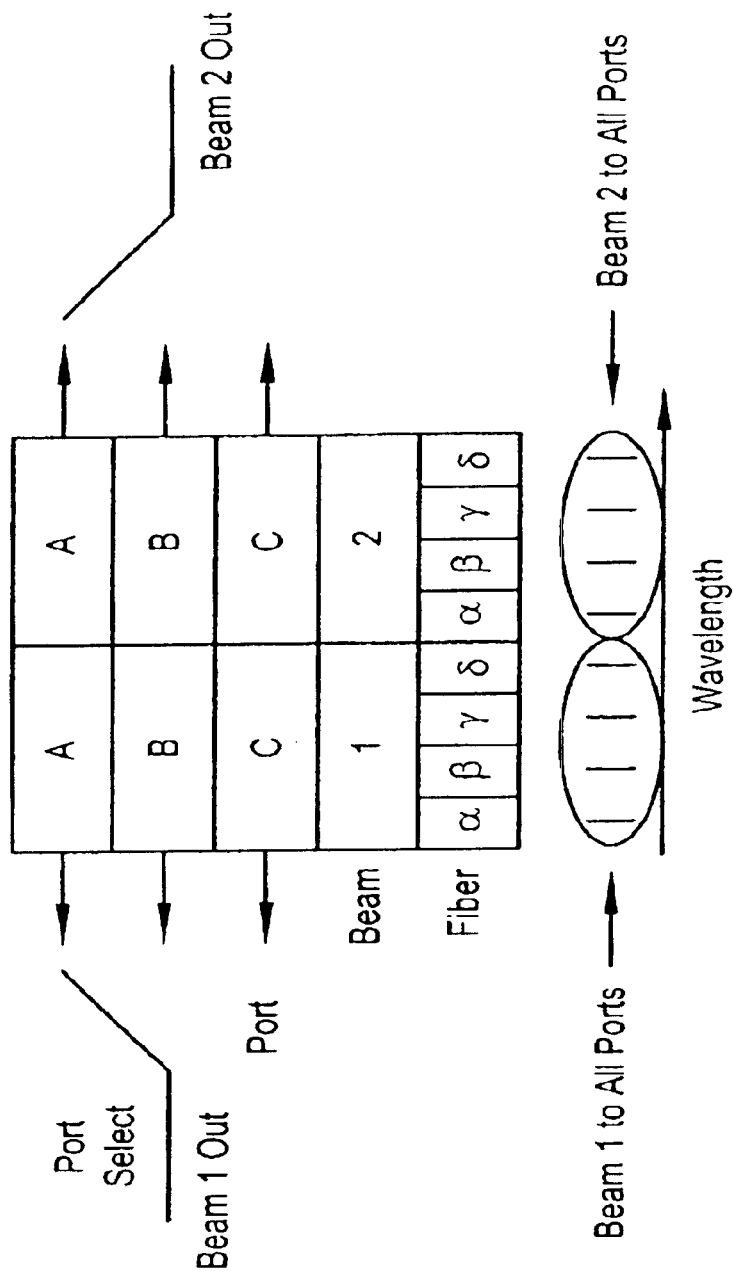
FIG. 11 is a table illustrating the wavelength hierarchy required in conjunction with the embodiment of FIG. 8.

Referring to FIG. 8, yet another embodiment of the invention is illustrated. In this variation, the port demultiplexers 60 of FIG. 5 are replaced with the same number of 1×3 fiber splitters 110. Photodetection takes place at the output of fiber multiplexers 113 and is performed by photodetectors 111. Beam multiplexers 73 and 74 of FIG. 5 are replaced with electrical switches 112, which permit to select the delay line desired for each beam. The addition of electrical switches eliminates the need for the laser wavelengths used to select a delay line set. Thus the configuration of FIG. 8 reduces the total number of wavelengths required from Nλ=P×B×F=24 to Nλ=B×F=8. If the beamformer has more than P=6 ports, the present configuration will have higher losses than the pure WDM configuration of FIG. 5, but will require P times fewer wavelengths. FIG. 11 shows the wavelength hierarchy required for the configuration of FIG. 8. These wavelengths are used only for beam separation and incoherent summation. The wavelength hierarchy of FIG. 11 is a truncated version of the one shown in FIG. 3b, where the empty wavelength slots of FIG. 3b are eliminated by the use of electrical switches instead of wavelength ranges for port selection.

Figure 9:
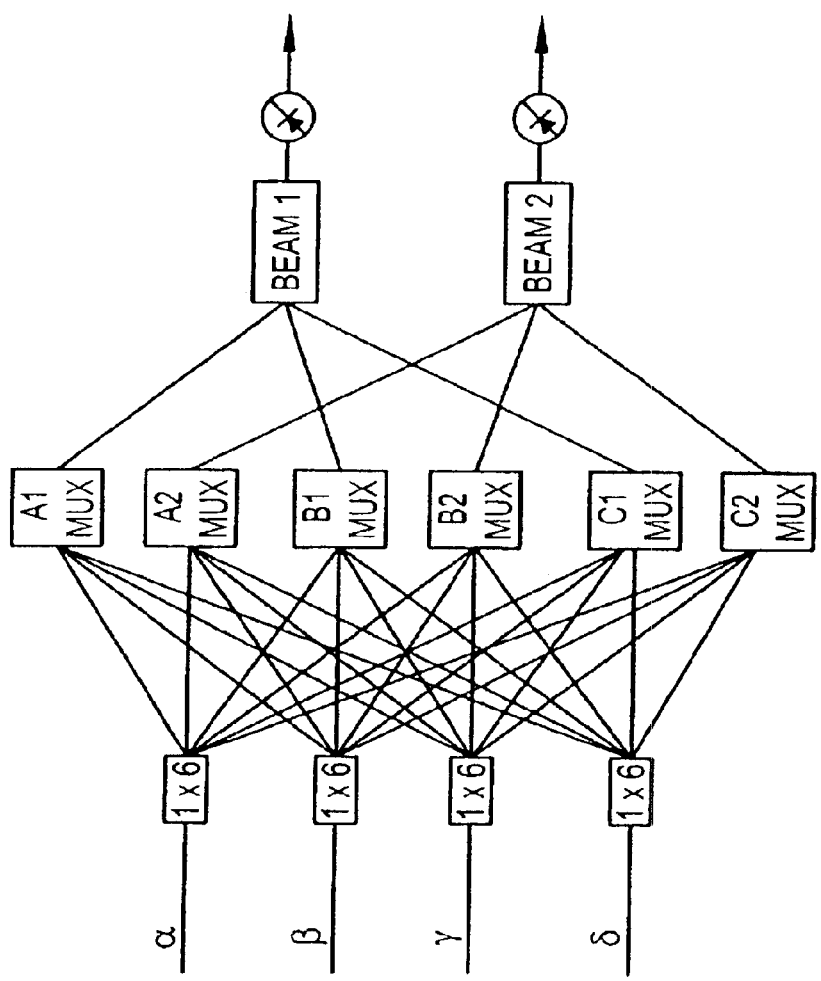
FIG. 9 is another variation of the invention of FIG. 5, where port and beam demultiplexers have been replaced with port-beam demultiplexers.

In another variation of the invention, the port and-beam demultiplexers of FIG. 5 can be replaced with a single port/beam demultiplexer. In this configuration the delay lines cannot be shared by the beams, and B times as many delay lines are needed. On the other hand, the use of a 1×Z WDM, instead of a 1×X and a 1×Y WDM can reduce losses for X<6 and Y<6 but Z=X×Y>6. In the particular example where P=3, B=2, and F=4, 1×3 port and 1×2 beam demultiplexers 60, 64, 65, and 66 of FIG. 5, are replaced with 1×6 port/beam demultiplexers, as illustrated by FIG. 9. These 1×6 port/beam demultiplexers would have six output fibers with passbands A1, A2, B1, B2, C1, C2, as shown in FIG. 3A. The output fibers are connected to corresponding fiber multiplexers 67, 68, 69, 70, 71 and 72 of FIG. 5.

Figure 10:
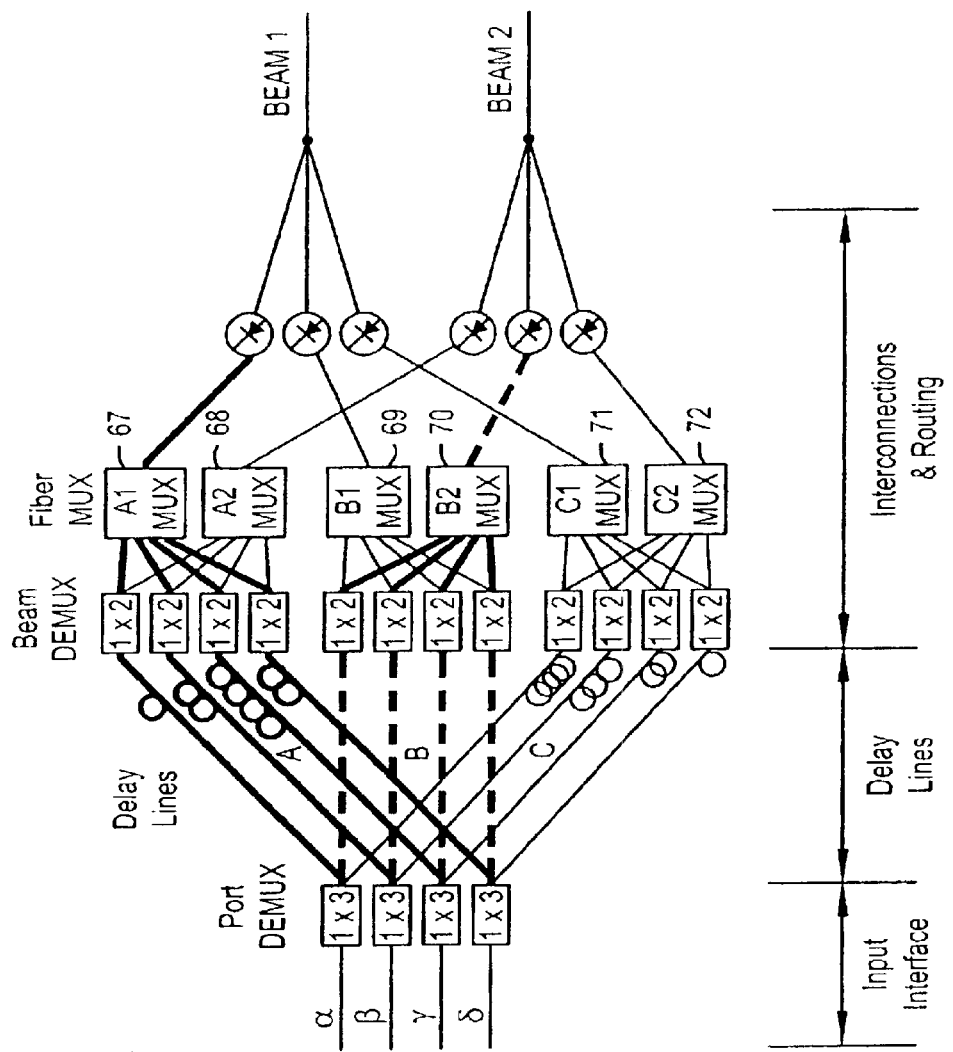
FIG. 10 is another variation of the invention of FIG. 5; where photodetectors have been placed at the outputs of each fiber multiplexer, and the signals are electrically combined.

Another useful variation of the basic invention presented in FIG. 5, is to place a photodetector at the output of each fiber multiplexer 67, 68, 69, 70, 71 and 72, as shown in FIG. 10. Then, the outputs of the photodetectors placed after fiber multiplexers 67, 69, and 71 (A1, B1, C1 respectively) can be electrically combined into beam 1, and the outputs of photodetectors placed after fiber multiplexers 68, 70, and 72 (A2, B2, C2 respectively) can be electrically combined into beam 2. This is possible because only one of the three outputs from A1, B1, C1 is active at any given time, and only one of the three outputs from A2, B2, C2 is active at any given time. This configuration does not require any switching and is completely passive. It has an important application in wavelength re-use networks and is discussed below.

Figure 12:
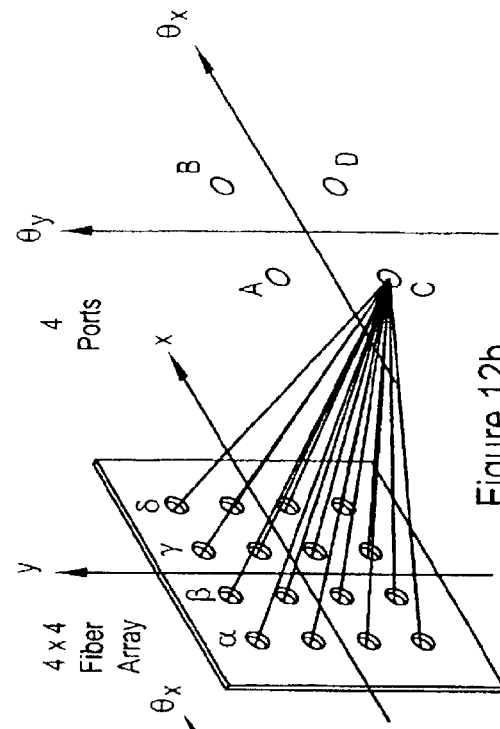
Figure 12:
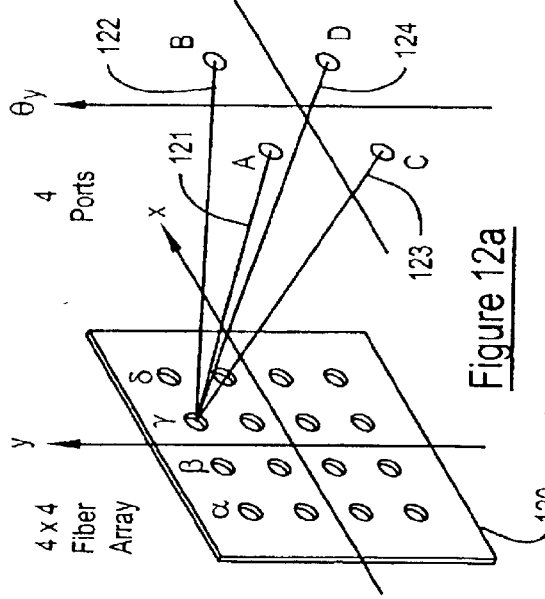

Generally, phased array antennas operate in two dimensions and require two-dimensional delay line networks. FIG. 12 shows the case of a 4×4 fiber array 120 feeding P=4 delay ports A, B, C, and D. A total of F×P=16×4=64 delay lines are required. For simplicity, FIG. 12a shows only delay lines 121, 122, 123 and 124, connecting fiber γ of the top row of array 120, to the four ports A, B, C, and D. For clarity, the delay lines that feed port C only are illustrated in FIG. 12b. Each of the F×P delay lines that constitute the system has a path length well defined that is determined by the system geometry, and the velocity of light in the delay lines. Equations 125 show the path length differences in the x and y directions, ΔLx and ΔLy, from one fiber to the next when given the geometry of the system (i.e., antenna element spacing D, and delay line scan angle components θx and θy) and the velocity of light in the delay line.

If implemented using fibers for the delay lines, the delay line network of FIG. 12 would be difficult to fabricate, and would require careful cutting to a specific length and splicing F×P fibers. However, this three-dimensional structure can be collapsed into two dimensions and fabricated along with the WDMs in an integrated structure using silica on silicon (SOS) waveguide technology. This collapse to two dimensions is possible because there is a unique mapping of length between input fiber and output port. For example, referring to FIG. 12a, fiber 121 (fiber γ of top row) connected to port A, has a length that is unique in the network. This is true for all of the F×P fibers that constitute the network. Consequently, each fiber can be placed on a flat surface. As long as their respective lengths are respected, this new two-dimensional structure is equivalent to the three-dimensional architecture of FIG. 12, and can perform the same functions. It is to be noted that when collapsed into two dimensions, the delay line waveguides will cross over each other, and slightly increase network loss. While low-loss cross-overs are easily made using SOS, minimal loss in the network is achieved by minimizing the number of cross-overs. In FIG. 5, cross-overs occur in all three areas between the four columns of WDMs. Trying different arrangements of the WDMs within each column, while keeping the interconnections the same, indicates that placing cross-overs in multiple areas minimizes their number. The network of FIG. 5 yields the minimum number of crossovers for the arrangements tried. It is thus a good candidate for a low-loss structure made with SOS. WDMs of the Array Waveguide Grating (AWG) type, can be fabricated using SOS, and easily integrated on the same substrate as the crossing waveguides and/or delay lines. The arrangement of FIG. 5 lends itself to standardization and fabrication of the network on one or on multiple substrates. For example, a standard set of interconnections and routing WDMs 132 (FIG. 5) could be made on one substrate, and a standard input interface 130 could be made on another. Application specific delay lines 131 could then be made and incorporated into the network. This approach would substantially lower the cost of making large numbers of photonic beamformers that only differ with respect to the delay lines required. Special attention to reducing losses could be paid, since the interconnection and routing section 132 which has the most cross-overs, would be one of the standard pieces.

Figure 13:
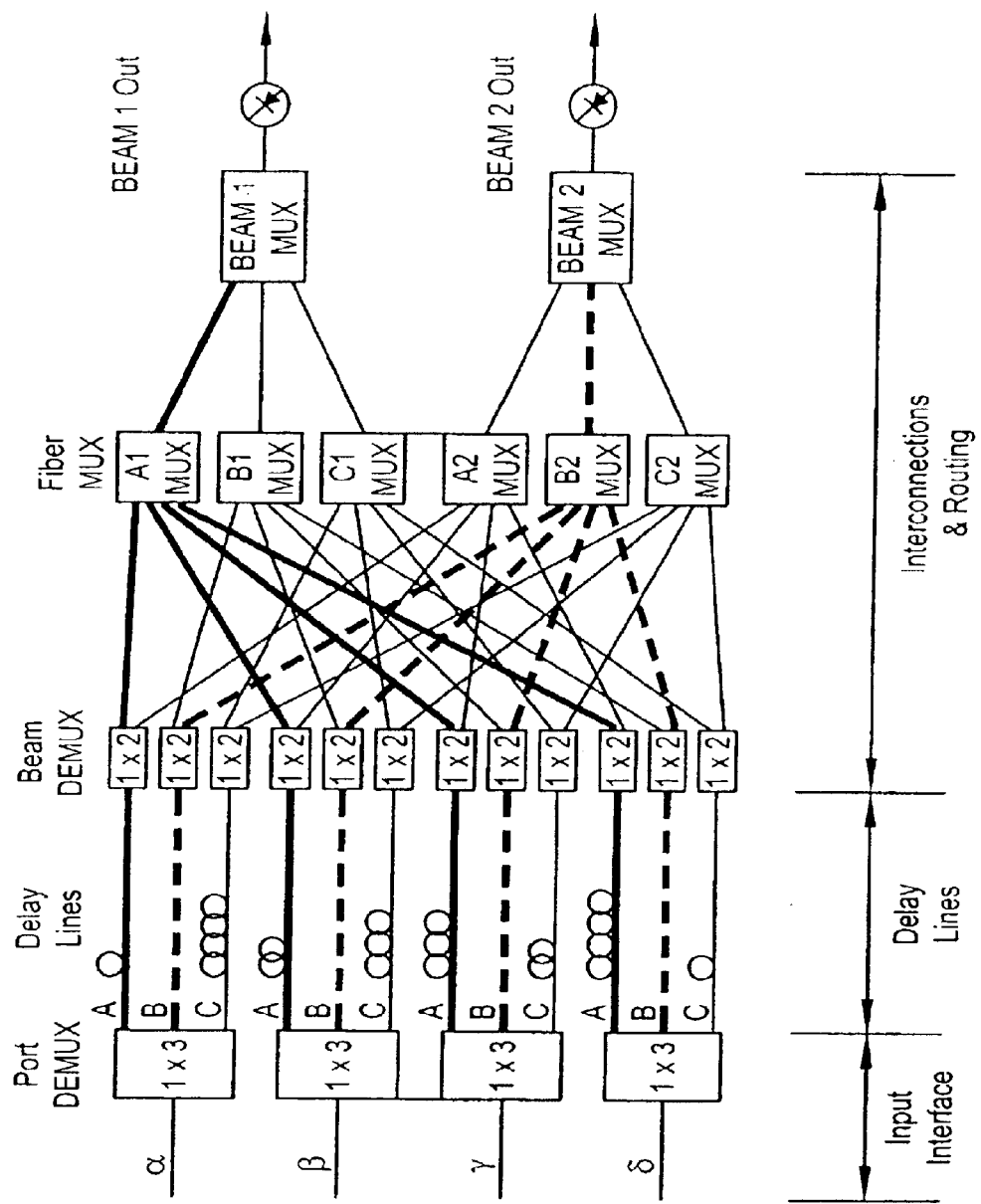
FIG. 13 is a block diagram of the embodiment of FIG. 5, where WDMs have been rearranged to place all cross-overs in one section of the network.

Referring to FIG. 13, an example of how the WDMs can be rearranged on the substrate placing all cross-overs in one section, is shown. This arrangement has more cross-overs and thus higher losses than the arrangement of FIG. 5. While the network of FIG. 5 was developed assuming a network-switched architecture, the rearranged system of FIG. 13 looks like an in-line switched network (compare with FIG. 1). The WDM system can be thus made to look like either network type simply by moving the WDMs and waveguides around while keeping the interconnections the same. Therefore, this invention may be used equally well in network-switched and in-line switched architectures.

If standard ITU wavelengths in the 1550 mm band are used with a spacing of 50 GHz, the system is limited to approximately 100 wavelengths. This number can be doubled using the non-Wavelength standard 1300 nm band to a maximum of Nλ=P×B×F=200 wavelengths. Most practical systems have around 100 fibers, leaving little room for beam and port operations. To overcome this limitation, methods of wavelength re-use will now be disclosed.

Figure 14:
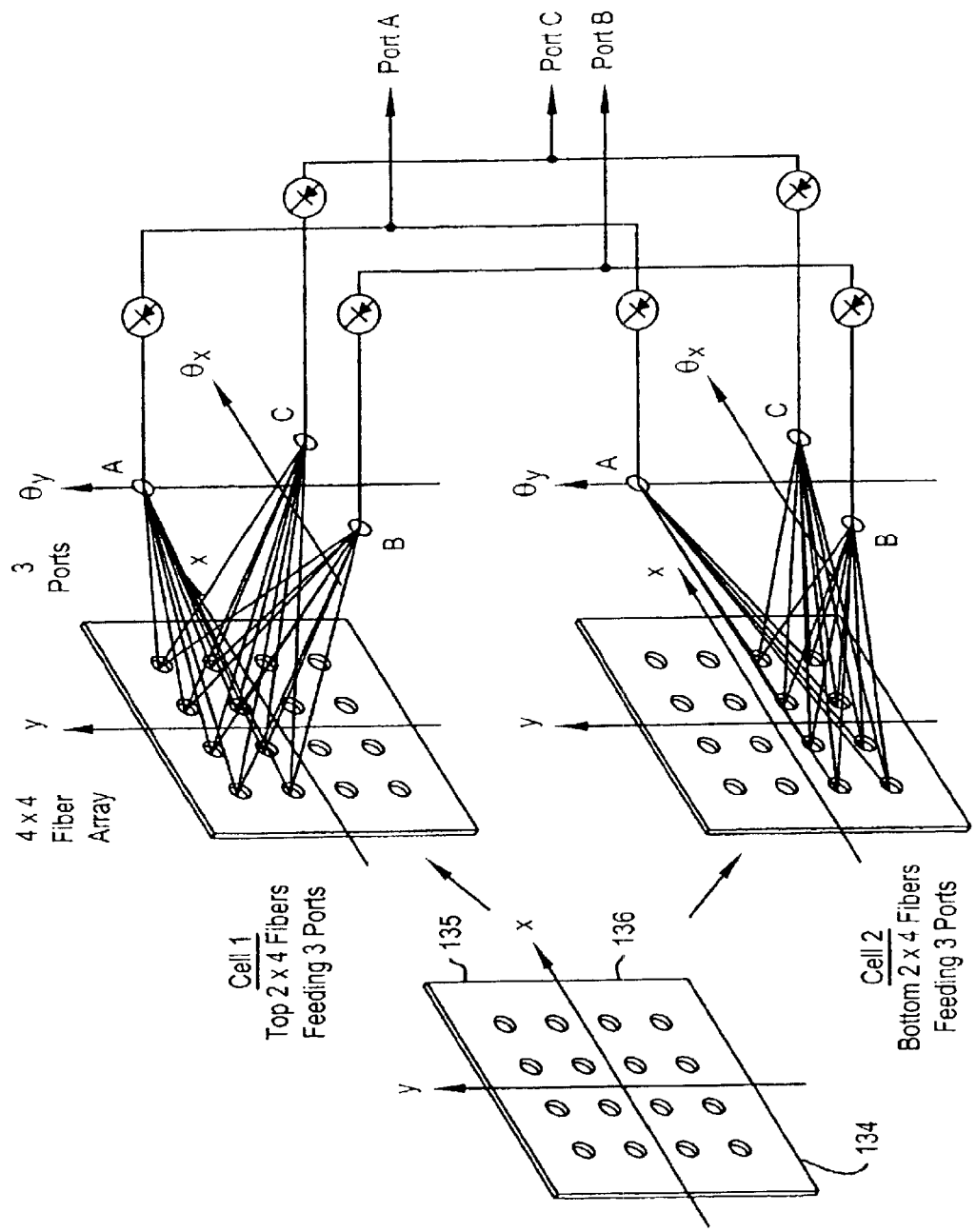
FIG. 14 shows how the 4×4 fiber array of FIGS. 12a and 12b can be divided into two 2×4 arrays in conjunction with the wavelength re-use technique.

The WDM techniques described herein are well suited to wavelength re-use. The general approach, as illustrated in FIG. 14, is to divide the two-dimensional array 134 of input fibers into M sub-arrays or cells 135 and 136, in such way that each cell uses W=P×B×(F/M) wavelengths. Thus, for M≧2 W is a fraction of the number of wavelengths needed in the original network.

Each cell uses the same set of W wavelengths, hence the term "wavelength re-use". The outputs of each cell, after going through the delay lines/ports (A, B, or C in FIG. 14), are separately photodetected. After photodetection the RF outputs of the photodetectors are electrically summed with equal length or corporate feeds to form the output beam. The cells can be formed of any subset of the fiber array, rows, columns, parts of rows or columns, or even randomly chosen elements throughout the array. All that is required is that the inserted delays be proper. The beamforming network for each cell is independent and self-contained. FIG. 14 illustrates the particular example of a 4×4 array of fibers divided into M=2 cells, each cell including 2×4 fibers. Each cell feeds P=3 ports, with only one beam being assumed in this example for simplicity. In general, the cells have different sets of delay lines because they represent different parts of the Rotman lens. However they all use the same wavelengths, WDM structure, and interconnect architecture. Consequently, this configuration lends itself well to the cost-saving standardization earlier described. Indeed, all cell networks preferably use identical input interfaces and interconnect/routing modules, and differ only in the amount of delay inserted by the delay lines utilized.

Figures 15A, 15B:
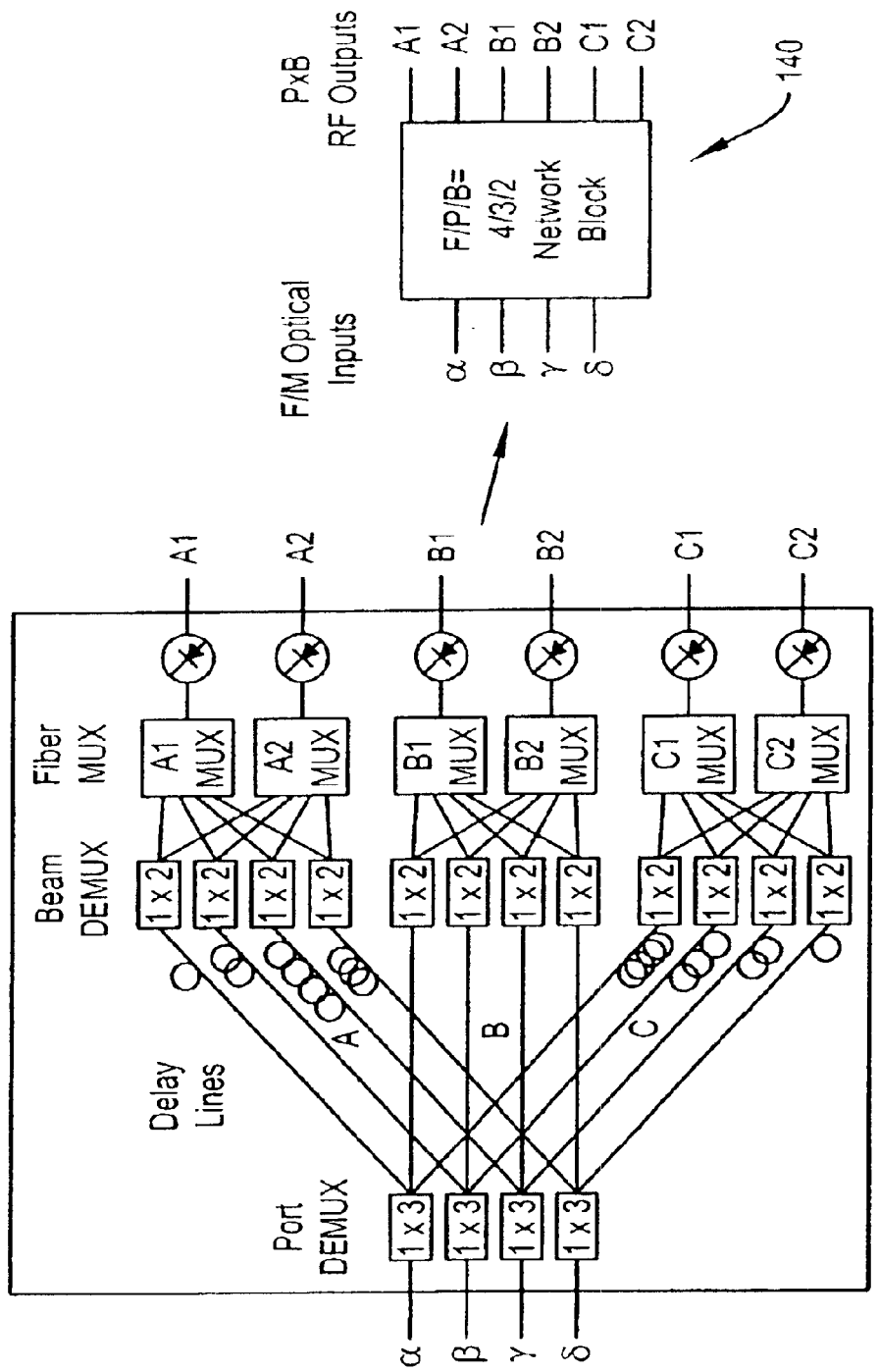
FIG. 15a shows the WDM architecture to be employed with the wavelength re-use method.
FIG. 15b is a simplified block diagram of FIG. 15a, and represents a network cell.

FIG. 15a shows the WDM architecture utilized in conjunction with the wavelength re-use method. Note that this structure is identical to the one shown in FIG. 5, except for the beam multiplexers which have been removed and replaced by photodetectors disposed at the outputs of each fiber multiplexer. After photodetection the signals can be electrically combined as discussed previously. FIG. 15b is a simplified block representation of the FIG. 15a. Since wavelength re-use configuration utilizes M times less wavelengths as the embodiment of FIG. 5, it will utilize M cells 140 of the type shown in FIG. 15b, to accomplish the same functions. The first cell uses a set of W wavelengths, and all subsequent cells "re-use" the same set of W wavelengths.

Figure 16:
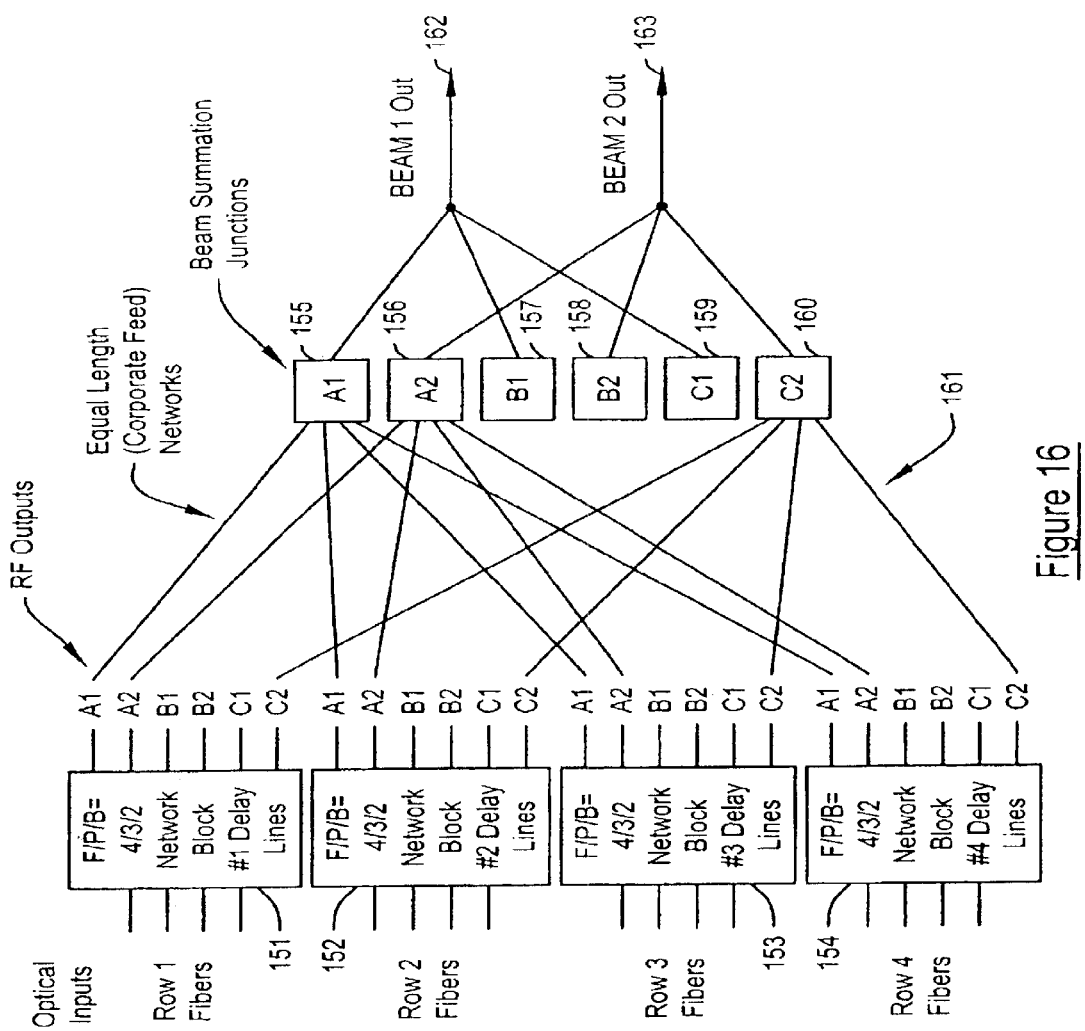
FIG. 16 shows how the network cells of FIG. 15b would be connected in conjunction with the wavelength re-use method, for the case of a 4×4 fiber array.

FIG. 16 shows an example of how cells 140 can be connected to perform the functions of a 4×4 fiber array, in accordance with the wavelength re-use method. The system of FIG. 16 handles B=2 beams and P=3 ports, and is a two dimensional system, contrary to prior art fiber arrays which are three-dimensional. Cells 151, 152, 153, and 154 represent rows 1, 2, 3, and 4 of the 4×4 fiber array, respectively. Each cell is an independent WDM network with P×B electrical outputs A1, B1, C1, A2, B2, C2, and each require the same P×B×(F/M)=3×2×(16/4)=24 wavelengths.

The cells are identical except for the length of the delay lines. The outputs A1, A2, B1, B2, C1, C2 of each cell are directed to the corresponding beam summation junction 155, 156, 157, 158, 159, 160, respectively, via corporate feed 161 (i.e., all A1 cell outputs are directed to A1 summation junction 155, all A2 cell outputs are directed to A2 summation junction 156, and so on). For clarity, only three feed lines corresponding to A1, A2, and C2 are shown in FIG. 16. The four signals entering A1 beam summation junction 155 are then vector summed into a single beam, and the same occurs at beam summation junctions 156, 157, 158, 159 and 160. The A1, B1, C1 junctions, 155, 156, 157, respectively, are then fed to a common beam 1 output 162. The A2, B2, C2 junctions, 158, 159, 160 respectively, are then fed to a common beam 2 output 163. The network requires no switching and is completely passive.

A fiber array with F fibers and M cells will require B×P×M photodetectors. The number of photodetectors needed is independent of the number of fibers in the array, and is a significant reduction over more conventional networks that do not use a different wavelength for each fiber involved in the vector summation.

Figure 17:
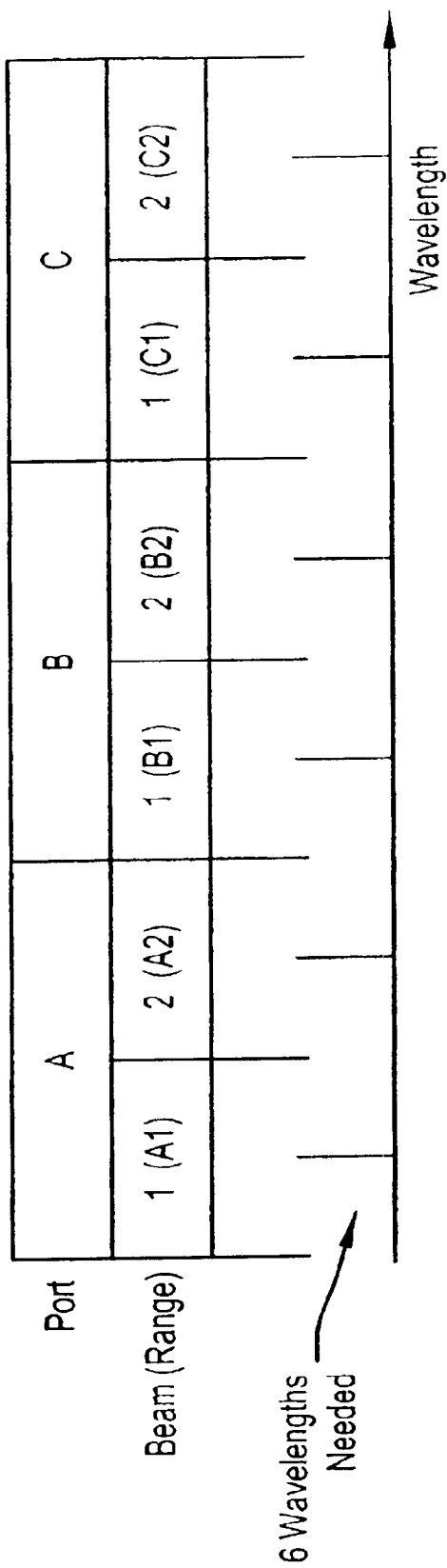
FIG. 17 is a table illustrating the wavelength hierarchy required in conjunction with the embodiment of FIGS. 18 and 19.
Figure 18:
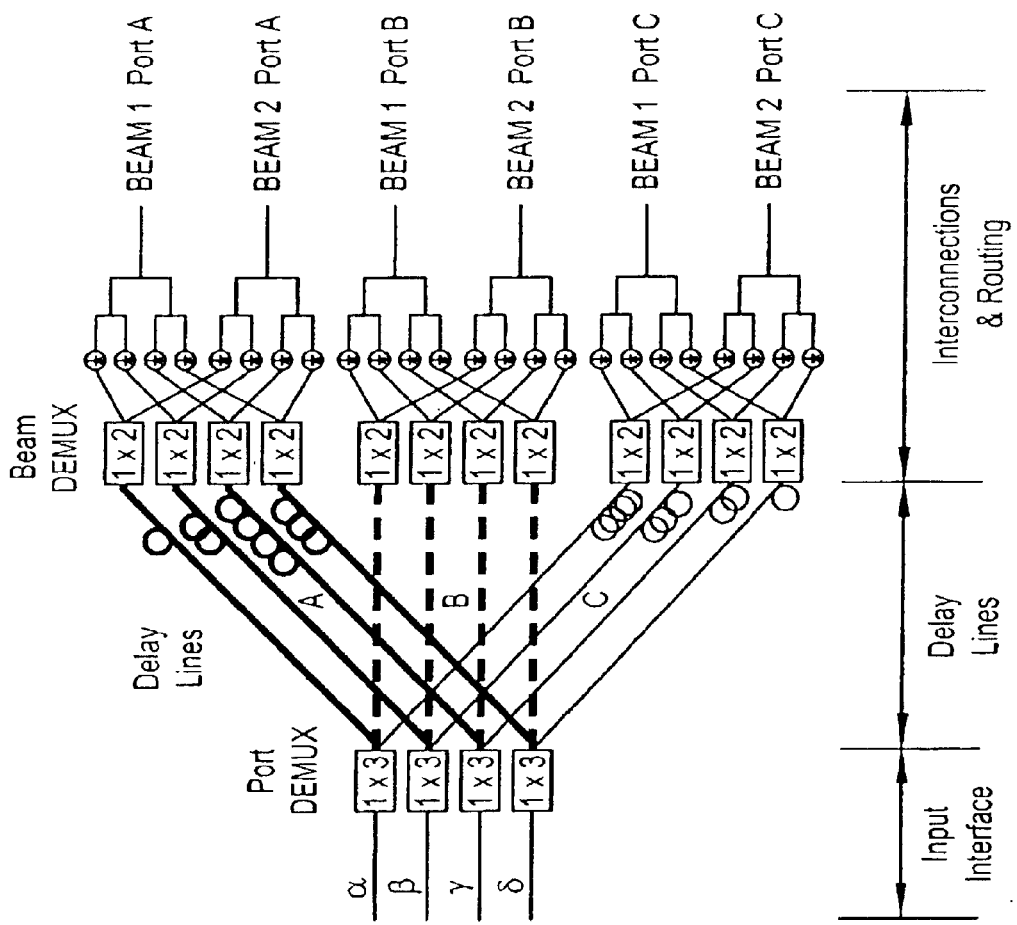
FIG. 18 is another variation of the invention where WDM filters are used for port and beam operations only. B×P×F photodetectors are required.
Figure 19:
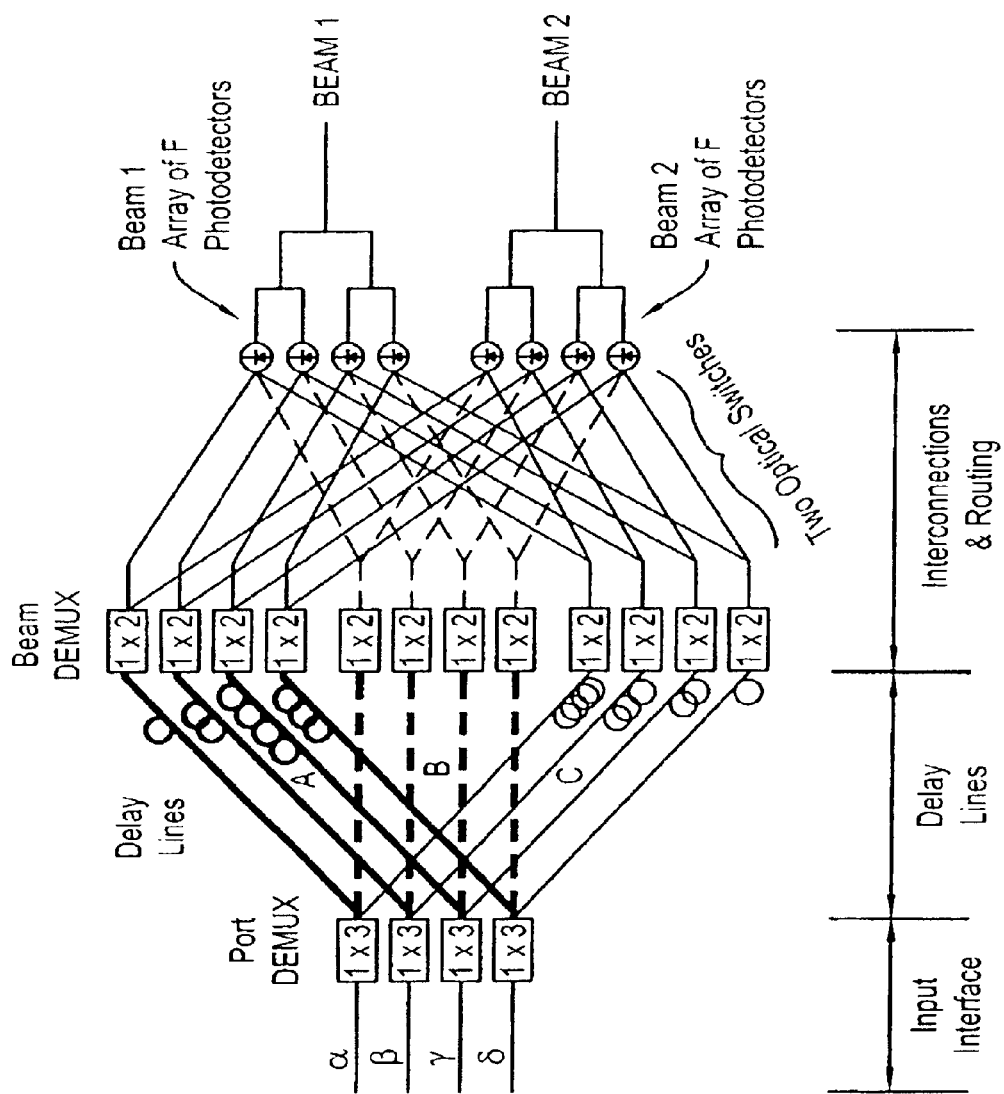
FIG. 19 is yet another variation of the invention where WDM filters are used for port and beam operations only as in FIG. 18, but requiring only B×F photodetectors because of the use of optical switches.

For example, if WDMs were used just for port and beam operations in a network-switched architecture using the wavelength hierarchy of FIG. 17, a photodetector would have to be placed on every fiber as shown in FIG. 18. This would require either B×P×F detectors as shown in FIG. 18, or port switching of B detector arrays each containing F detectors (for a total of B×F detectors) as shown in FIG. 19. The number of photodetectors needed increases while the number of wavelengths required decreases. For the example of FIG. 18, 24 photodetectors are needed while only 6 wavelengths are required for the system to function. Since M can be much less than F, if one re-uses a large number of wavelengths, B×P×M can be much less than both B×P×F and B×F, and thus the number of photodetectors required can be largely reduced. A trade-off, between the cost and complexity of adding laser wavelengths versus reducing the number of photodetectors, must be made for each particular photonic beamforming system.

Fiber splitters may be substituted for WDMs as discussed previously. Furthermore, if switching is used at the output of the A1, A2, B1, B2, C1, C2 junctions, a beam-fiber wavelength hierarchy similar to FIG. 11 can be used to further reduce the number of wavelengths required to B×(F/M)=8. In this case, B=2 switches, each having P=3 possible positions, are required.

Having described the invention in conjunction with certain embodiments thereof, modifications and variations will now certainly suggest themselves to those skilled in the art. As such, the invention is not limited to the disclosed embodiments except as required by the appended claims.

What is claimed is:

1. A method of beamforming comprising the steps of:
   (a) synthesizing a plurality of optical wavefronts each comprising of plurality of optical wavelengths;
   (b) receiving a plurality of incoming electrical wavefronts with an antenna;
   (c) mixing said plurality of optical wavefronts with said plurality of incoming electrical wavefronts by optical modulation to provide a plurality of resultant optical wavefronts;
   (d) directing each resultant optical wavefront to a predetermined set of delay lines; and
   (e) separating each resultant optical wavefronts in order to direct each one to a different output.

2. The method of beamforming as in claim 1 wherein the step of synthesizing a plurality of optical wavefronts, includes the steps of:
   (a) specifically selecting a subset of said plurality of optical wavelengths in accordance with the set of delay lines desired; and
   (b) specifically selecting a subset of said plurality of optical wavelengths in accordance with the output desired.

3. The method of claim 2 wherein the step of directing each resultant optical wavefront to a predetermined set of delay lines, includes providing WDM filters capable of channeling each resultant optical wavefront into the predetermined delay line, by dispersing the wavelengths contained in each resultant optical wavefronts.

* * * * *